United States Patent
Jung et al.

(10) Patent No.: US 6,856,244 B2
(45) Date of Patent: Feb. 15, 2005

(54) IDENTIFICATION DEVICE FOR A CHILD SEAT

(75) Inventors: Roland Jung, Stuttgart (DE); Carsten Lorenz, Gechingen (DE); Michael Meyer, Altdorf (DE); Harald Rudolf, Tuebingen (DE); Frank Schink, Grosselfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/242,796

(22) Filed: Sep. 13, 2002

(65) Prior Publication Data

US 2003/0066702 A1 Apr. 10, 2003

(30) Foreign Application Priority Data

Sep. 15, 2001 (DE) .......................................... 101 45 626

(51) Int. Cl.⁷ ................................................. B60Q 1/00
(52) U.S. Cl. ...................... 340/436; 340/438; 340/666; 340/667
(58) Field of Search ................................ 340/666, 667, 340/436, 438, 572.1; 180/167, 268, 271; 280/735, 732, 734; 735/732; 732/734; 307/9.1, 10.1

(56) References Cited

U.S. PATENT DOCUMENTS

| | | | | |
|---|---|---|---|---|
| 5,515,933 A | * | 5/1996 | Meyer et al. | 180/273 |
| 5,525,843 A | * | 6/1996 | Howing | 307/9.1 |
| 5,618,056 A | | 4/1997 | Schoos et al. | 280/735 |
| 5,690,356 A | * | 11/1997 | Lane, Jr. | 280/735 |
| 5,783,871 A | | 7/1998 | LeMense | 307/10.1 |
| 5,790,031 A | | 8/1998 | Shelton et al. | 340/572 |
| 5,831,342 A | * | 11/1998 | Vivacqua et al. | 307/10.1 |
| 5,851,026 A | | 12/1998 | Schoos et al. | 280/735 |

FOREIGN PATENT DOCUMENTS

| | | |
|---|---|---|
| DE | 44 09 971 C2 | 3/1994 |
| DE | 196 38 458 C1 | 9/1996 |
| DE | 197 22 085 A1 | 5/1997 |
| DE | 199 28 856 A1 | 6/1999 |
| JP | 09254739 A | 9/1997 |
| JP | 2000198411 A | 7/2000 |

* cited by examiner

Primary Examiner—Hung Nguyen
(74) Attorney, Agent, or Firm—Crowell & Moring LLP

(57) ABSTRACT

An identification device for retrofitting a child seat is provided for detecting the child seat on a vehicle seat in a motor vehicle by means of a child seat detection device. A transceiver component, connected to a control and evaluation device, for transmitting an electromagnetic transmission signal and for receiving an electromagnetic reception signal, is arranged as part the child seat detection device in the vehicle seat or in the direct vicinity of the vehicle seat. The reception of the transmission signal in the identification device causes transmission of the reception signal. The identification device has external wiring. By means of a defined mechanical manipulation which brings about a defined change in the external wiring, the identification device can be changed from an inactive initial state to an active state.

21 Claims, 3 Drawing Sheets

IDENTIFICATION DEVICE FOR A CHILD SEAT

BACKGROUND AND SUMMARY OF THE INVENTION

This application claims the priority of German patent document 101 45 626.3, filed Sep. 15, 2001, the disclosure of which is expressly incorporated by reference herein.

The invention relates to an identification device for detecting the presence of a child seat on a vehicle seat in a motor vehicle.

Restraining systems are installed in vehicles in order to reduce stressing of vehicle occupants in an accident. Because such systems are activated and deployed very quickly to ensure a sufficient protective effect, they output large forces which place the vehicle occupant at risk under unfavorable conditions. Small children are especially affected by the risk to vehicle occupants from restraining systems. Many restraining systems constitute a particular risk for children who are accommodated in specific seat devices. In particular, very small children in toddler seats which are installed facing away from the direction of travel are at high risk from an airbag.

This risk is countered by adapting the restraining systems to vehicle occupant parameters (for example, by inflating an airbag with a reduced air current, or by not inflating it at all, if there is a child on a vehicle seat). In order to adapt a restraining system to a child in a child seat, the presence of the child seat on a vehicle seat must be sensed reliably and safely. For this purpose, a child seat detection device, such as is found in some contemporary vehicles, is used.

A device for detecting the presence of a child seat situated on a vehicle seat, disclosed in German patent document DE 4409971 C2, transmits an electromagnetic signal in the form of a measurement field in the interior of a motor vehicle by means of an antenna which is located in the vehicle seat. The device senses a change in the measurement field which is brought about by, and is characteristic of an identification device, as a reception signal. In order to transmit the electromagnetic signal, the antenna is fed from a base station. The identification device which changes the measurement field (i.e., which receives the transmission signal and transmits the reception signal), is mounted on the child seat to be sensed. The mounting can be carried out when a child seat which is especially equipped for a child seat detection means is manufactured, or alternatively can be retrofitted on any other child seat, for example by clipping on, screwing on or bonding on.

The object of the invention is to provide an identification device for the detection of a child seat, which identification device is largely protected against misuse and can be retrofitted to the child seat.

This and other objects and advantages are achieved by the identification device according to the invention in which a transceiver component is connected to a control and evaluation device, for transmitting an electromagnetic transmission signal and for receiving an electromagnetic reception signal. The transceiver is arranged as part of the child seat detection means in the vehicle seat or in the direct vicinity of the vehicle seat. In an identification device which is provided for retrofitting a child seat, reception of the transmission signal emitted by the child seat detection means causes a reception signal to be emitted. When a reception signal which is characteristic of the child seat is detected, the child seat detection means concludes that a child seat is present and sets the safety device to a modified state (i.e., by switching off the front-seat-passenger's airbag).

According to the invention, the identification device has external wiring, and can be changed from an inactive initial state to an active state by a predetermined mechanical manipulation that brings about a defined change in the external wiring. The identification device transmits a characteristic reception signal only if it is in the active state. If this characteristic reception signal is sensed by the child seat detection means, the airbag is, for example, switched off by the safety device. The advantage of the identification device according to the invention is that this has to be intentionally manipulated in order to be active, and erroneous detection of a child seat due to an identification device which happens to be present in the sensing region of the child seat detection means is thus prevented.

In one refinement of the identification device, the predetermined mechanical manipulation takes place forcibly in conjunction with the attachment of the identification device, which is to be retrofitted, to a child seat. In particular, the defined mechanical manipulation takes place unavoidably when the identification device is prepared for its attachment to a child seat, so that identification device cannot be attached to a child seat without performing the necessary manipulation to activate the identification device being performed, and thus without the identification device being active.

For example, an identification device which is preferably embodied as a film comprises a self-adhesive surface which is provided for attachment of the identification device to a child seat. This self-adhesive surface is provided with a pull-off protective film, and at least part of the external wiring changes in an anticipated fashion when the protective film is removed from the self-adhesive surface.

In an alternative embodiment, the defined mechanical manipulation requires not only that the identification device be prepared for attachment to a child seat, but also that the attachment itself be completed. That is, in order to change the identification device from an inactive initial state to an active state, it is necessary, for example, to screw the identification device to the child seat, so that at least one of the actively attached fastening screws closes or opens an electrical contact. As a result, the activated state of the identification device is associated even more closely with the child seat so that even a prepared identification device which is in the sensing region of a child seat detection device and is not yet attached to a child seat cannot lead to an erroneous detection of a child seat.

In an advantageous development of the identification device, the defined change in the external wiring takes place forcibly when the identification device is adapted to a child seat. The change in the external wiring which takes place when the identification device is adapted to the child seat is specific to the type of child seat. This has the advantage that the child seat detection device can sense the type of child seat and the safety device can be actuated in accordance with this type of child seat. Examples of various types of child seats and baby seats, toddler seats and seat bases without backrest.

The identification device is adapted, for example, by changing its external shape. That is, a predetermined change of at least part of the external wiring takes place as a result of a change of the external shape. For example, the shape of the identification device can be adapted to a child seat (in particular its external shape), by breaking off predetermined break components at predeterminable break points when there is a plastic housing, or by cutting off predeterminable parts of the surfaces of the film when the identification device is embodied as a film.

To increase detection reliability, the identification device is embodied in such a way that at least two antennas each extend largely over the entire surface of the film. As a result, on the one hand, the entire available surface is utilized in order to obtain a larger aperture of the antennas, and, on the other hand, the sensitivity is increased further by using two antennas in addition for redundancy.

Other objects, advantages and novel features of the present invention will become apparent from the following detailed description of the invention when considered in conjunction with the accompanying drawings.

DETAILED DESCRIPTION OF THE DRAWINGS

Figure 1:
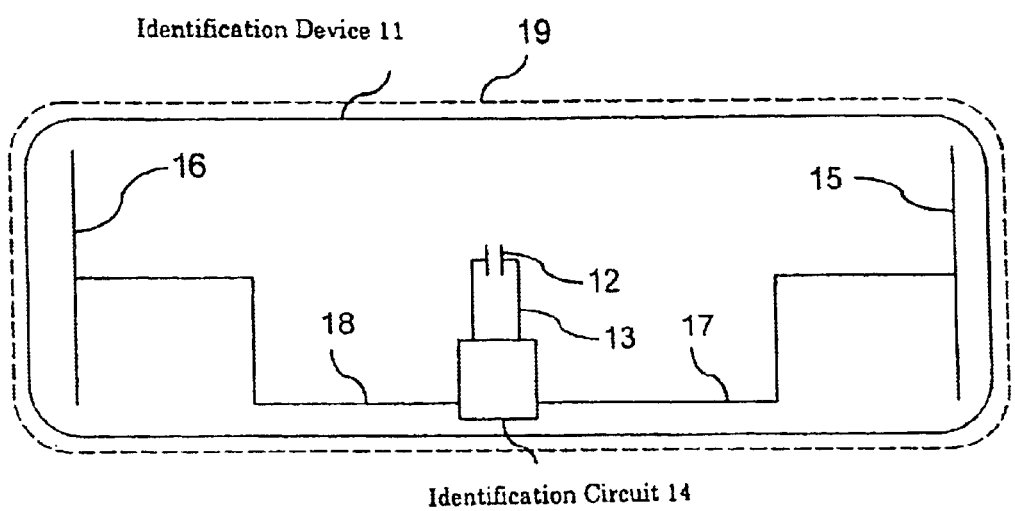
FIG. 1 shows an identification device according to the invention in the form of a film with an embedded identification circuit and with a capacitive element for detecting a defined change in the external wiring.

FIG. 1 shows an identification device 11 according to the invention in the form of a film with an embedded identification circuit. The identification circuit has a capacitive element 12 for detecting a defined change in the external wiring. This capacitive element 12 is connected to an internal identification circuit 14 via power lines 13. This internal identification circuit 14, for example in the form of a semiconductor chip, is connected in turn to two antennas 15, 16 via signal lines 17, 18. (Alternatively, the identification device 11 may have only one antenna, or more than two antennas.) The installation direction of the identification device, and thus of the child seat, can be sensed by means of two or more spatially separated antennas.

When there is an identification device in the active operating state, the antennas 15, 16 receive a transmission signal from the child seat detection device, conduct this signal via the signal lines 17, 18 to the identification circuit 14, and the latter transmits a reception signal for the child seat detection device in response to the received transmission signal. The reception signal is transmitted by the identification circuit 14 via the signal lines 17, 18 to the antennas 15, 16 and radiated by them. The identification device 11 is active as soon as the capacitance of the capacitive element 12 of the external wiring is within a predefinable value range.

In the delivered (uninstalled) state of the identification device 11, at least one surface of the film in which it is embedded is covered by a metallized protective film 19, which changes the capacitance of the capacitive element 12 to a value that is far outside the predefinable range in which the capacitance would have to lie for the identification device 11 to become active. A capacitance or some other electrical variable of the external wiring is, for example, integrated into the identification circuit 14 in such a way that an electrical resonant circuit which is necessary for transmitting or receiving a signal is tuned with it.

A metallized protective film 19 additionally changes the reception and irradiation characteristic of the antennas 15, 16 or largely prevents reception and irradiation of electromagnetic waves by the antennas 15, 16. A second metallized protective film at the second end of the identification device 11 amplifies both the change in the capacitance of capacitive element 12 and the screening of the antennas 15, 16. If only the capacitance is to be changed, it is sufficient to attach the metallization on the protective film 19 in the vicinity of the capacitive element 12.

If the identification device 11 is to be activated, a defined mechanical manipulation must be carried out by removing the protective film 19 (or both protective films if there are two) from the identification device 11. In this context, the identification device 11 advantageously has a self-adhesive surface under the protective film 19 on one side, for attaching the identification device 11 to the child seat. As the protective film 19 has to be removed in order to attach the self-adhesive identification device 11, it is ensured that the identification device 11 is active if it is mounted on the child seat.

Figure 2:
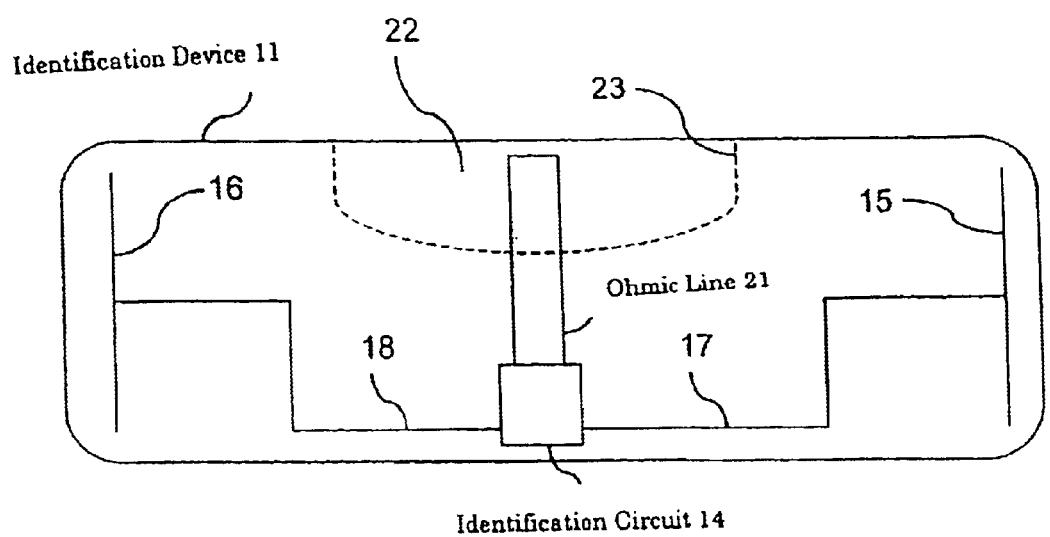
FIG. 2 shows another embodiment of the identification device according to the invention with an ohmic element for detecting a defined change in the external wiring.

FIG. 2 shows a second embodiment of the identification device 11 according to the invention, in which a film has an ohmic connecting line 21 for detecting a defined change in the external wiring. Before mounting on a child seat, in this identification device 11, a defined mechanical manipulation is carried out by disconnecting the predefinable separation region 22 which is predefined by means of a marking line 23. This can be carried out by tearing along a perforation or by simply cutting along a marking line 23. Here, the ohmic line 21 of the external wiring is cut through and the resistance between the two terminals of the ohmic line on the identification circuit 14 is greatly increased, causing the identification device 11 to become active. It is advantageous if the cutting-off of the separation region 22 must always take place before the identification device 11 is attached to the child seat. This is achieved in that the separation region is selected such that the identification device cannot be attached to the child seat, or can only be attached with difficulty, as long as the separation region 22 is not cut off. For example, an elevation in the child seat can be used for this or an elevation in the separation region can be provided on the identification device 11.

Figure 3:
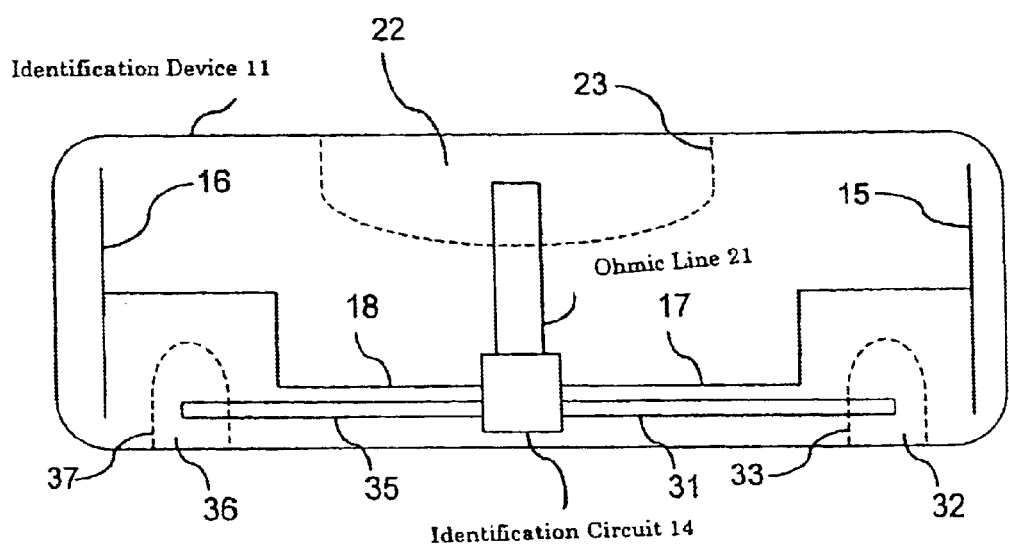
FIG. 3 shows still another embodiment of the identification device according to the invention with three ohmic elements for detecting a defined change in the external wiring.

FIG. 3 shows still a further identification device 11 according to the invention, similar to that from FIG. 2, in which two further separation regions 32, 36 are added, which are cut off along the marking lines 33, 37 as described for the region 22 in FIG. 2. Here, the ohmic lines 31 and 35 are disconnected in order to change the external wiring and make the identification device 11 active. If there are further separation regions 22, 32, 36, they can be used to adapt the identification device 11 to a child seat, or to a type of child seat. For example, it is predetermined that only the region 22 is to be removed for a baby seat, and in addition the separation regions 32 and 36 are to be removed for a child seat for 1- to 4-year olds, additional differentiation being made possible by means of further separation regions. Such predetermined features are supported by the adaptation of the position and shape of the separation regions to the respective type class of child seats, for example by virtue of the fact that the identification device can be attached only to the child seat if the necessary separation region is cut off.

In addition, the reliability of use can be increased by virtue of the fact that a metallization which, at defined points on the identification device 11, brings about a change in the external wiring similar to the metallized protective film 19 corresponding to FIG. 1, is attached, or can at least be retrofitted, to the child seat. As a result, the external wiring can be associated with the correct adaptation to a child seat, and in addition this type of child seat can be sensed.

A combination of the protective film 19 which is metallized at at least certain points on the identification device 11, and removal of defined separation regions on said identification device 11 can further increase the reliability when retrofitting a child seat to an identification device for the automatic detection of a child seat.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A child seat detection device for detecting presence of a child seat in a vehicle seat of a motor vehicle, comprising:
   a transceiver component arranged in or in proximity to the vehicle seat;
   a control and evaluation device connected to the transceiver component for transmitting an electromagnetic transmission signal and for receiving an electromagnetic reception signal;
   an identification device that is attachable to a child seat; wherein,
   reception of a transmission signal by the identification device, when it is in an operable state, causes the identification device to transmit a reception signal;
   the identification device has external wiring; and
   the identification device can be changed from an inoperable initial state to said operable state by a predetermined mechanical manipulation which brings about a defined change in the external wiring.

2. The identification device according to claim 1, wherein the defined mechanical manipulation takes place necessarily in the course of attachment of the identification device to a child seat.

3. The identification device according to claim 2, wherein the type of mechanical manipulation necessary to place the identification device in said operable state depends on a type of said child seat.

4. The identification device according to claim 2, wherein the defined change in the external wiring is caused by a mechanical intervention in which an external shape of the identification device is adapted.

5. The identification device according to claim 3, wherein the defined change in the external wiring is caused by a mechanical intervention in which an external shape of the identification device is adapted.

6. The identification device according to claim 2, wherein the defined change in the external wiring is caused by removal of a protective film from a self-adhesive surface of the identification device.

7. The identification device according to claim 1, wherein the defined change in the external wiring is caused by attachment of said identification device to a child seat in a defined manner.

8. The identification device according to claim 2, wherein the defined change in the external wiring is caused by attachment of said identification device to a child seat in a defined manner.

9. The identification device according to claim 1, wherein:
   the identification device is arranged in a film composite; and
   the film composite has a self-adhesive surface for the attachment to a child seat.

10. The identification device according to claim 2, wherein:
    the identification device is arranged in a film composite; and
    the film composite has a self-adhesive surface for the attachment to a child seat.

11. The identification device according to claim 9, wherein at least two antennas each extend over an entire film surface.

12. A child seat detection device, comprising:
    a transmitter-receiver unit situated in proximity to a seat of a motor vehicle, for transmitting a first signal, and receiving a second signal indicative of presence of a child seat situated in said vehicle seat;
    an identification device which is attachable to a child seat and which can be placed in an operable state for transmission of a second signal in response to reception of a first signal; wherein,
    said identification device has external wiring which is modifiable to place said identification device in said operable state; and
    attachment of said identification device to a vehicle seat causes modification of said external wiring.

13. A child seat detection device according to claim 12, wherein modification of said external wiring comprises a change in one of a capacitance and a resistance of said external wiring.

14. A child seat detection device according to claim 13, wherein:
    the identification device is arranged in a film composite;
    the film composite has a self adhesive layer for attaching the identification device to a child seat, which self adhesive layer is initially covered by a protective film; and
    removal of the protective film causes said modification of said external wiring.

15. A child seat detection device according to claim 12, wherein:
    the identification device is arranged in a film composite;
    the film composite has portions which must be removed to apply said film composite to said vehicle seat; and
    removal of said portions causes said modification of said external wiring.

16. An identification device for a child seat, comprising:
    signal means which can be placed in a operable state for receiving a first signal from an identification device transmitter-receiver situated in proximity to a vehicle seat, and for generating a second signal indicative of presence of said identification device in proximity to said vehicle seat;
    first means for attaching said identification device to a child seat; and
    second means for causing said signal means to change from an initial inoperable state to said operable state in response to attachment of said identification device to a child seat.

17. A child seat detection device according to claim 16, wherein said second means comprises a modifiable external wiring element of said identification device, modification of which activates said identification device.

18. A child seat detection device according to claim 17, wherein:

the identification device is arranged in a film composite;

the film composite has a self adhesive layer for attaching the identification device to a child seat, which self adhesive layer is initially covered by a protective film; and removal of the protective film causes said modification of said external wiring.

19. A child seat detection device according to claim 17, wherein:

the identification device is arranged in a film composite;

the film composite has portions which must be removed to apply said film composite to said vehicle seat; and removal of said removable portions causes said modification of said external wiring.

20. A child seat detection device according to claim 18, wherein modification of said external wiring comprises a change in one of a capacitance and a resistance of said external wiring.

21. A child seat detection device according to claim 19, wherein modification of said external wiring comprises a change in one of a capacitance and a resistance of said external wiring.

* * * * *